United States Patent
Zhu et al.

(10) Patent No.: US 7,532,826 B2
(45) Date of Patent: May 12, 2009

(54) OPTICAL DEMULTIPLEXER AND RECEIVER ASSEMBLY

(75) Inventors: Lijun Zhu, Dublin, CA (US); Grigore Suruceanu, Chavannes-Pres-Renens (CH); Robert P. Lombaerde, Belmont, CA (US); Jignesh H. Shah, Sunnyvale, CA (US); Joseph I. Vanniasinkam, San Ramon, CA (US)

(73) Assignee: Beam Express, Inc, Sunnyvale, CA (US)

( * ) Notice: Subject to any disclaimer, the term of this patent is extended or adjusted under 35 U.S.C. 154(b) by 407 days.

(21) Appl. No.: 11/218,680

(22) Filed: Sep. 2, 2005

(65) Prior Publication Data

US 2007/0053690 A1 Mar. 8, 2007

(51) Int. Cl.
*H04B 10/06* (2006.01)
*H04J 14/02* (2006.01)

(52) U.S. Cl. .................... 398/212; 398/86; 398/202; 398/214

(58) Field of Classification Search ............... 398/202, 398/212, 214, 86
See application file for complete search history.

(56) References Cited

U.S. PATENT DOCUMENTS 6,114,413 A * 9/2000 Kang et al. ............. 523/210
6,201,908 B1 * 3/2001 Grann ..................... 385/24
6,542,306 B2 * 4/2003 Goodman ................. 359/634
6,798,932 B2 * 9/2004 Kuhara et al. ............ 385/14
6,870,976 B2 * 3/2005 Chen et al. .............. 385/14
2005/0105907 A1 * 5/2005 Richardson et al. ........ 398/79
2005/0163439 A1 7/2005 Vanniasinkam et al.

OTHER PUBLICATIONS

Spec Sheet, Analog Devices AD8015 Wideband/Differential Output Transimpedance Amplifier, Rev A, Jan. 1996.*
International Search Report for PCT/US06/34173 dated Jun. 7, 2007.

* cited by examiner

*Primary Examiner*—Ken N Vanderpuye
*Assistant Examiner*—Daniel G Dobson
(74) *Attorney, Agent, or Firm*—Amin, Turocy & Calvin, LLP

(57) ABSTRACT

Apparatus for demultiplexing a wavelength division multiplexed optical signal comprising a plurality of signals each having a different wavelength. The apparatus comprises a demultiplexer sub-assembly and a multi-channel receiver optical sub-assembly. The demultiplexer sub-assembly comprises a filter block sub-assembly for splitting the input optical signal. The receiver optical sub-assembly comprises an array of photo detectors for converting the optical signals from the filter block sub-assembly into electrical signals. The electrical signals are amplified by amplifier ICs and transmitted through electrical leads. The demultiplexer sub-assembly and the multi-channel receiver optical sub-assembly are actively aligned and fixed together.

15 Claims, 9 Drawing Sheets

OPTICAL DEMULTIPLEXER AND RECEIVER ASSEMBLY

BACKGROUND

The present invention relates to the field of optical communication devices. More specifically, the present invention relates to a receiver optical sub-assembly (ROSA).

In an optical communication system, fiber optic cables are used to transmit and receive large volumes of information at high speeds. In a conventional ROSA, a photodiode chip packed in a coaxial type of transistor outline (TO) can (or package) is typically used to detect optical signals received over a fiber optic cable. Further, the conventional ROSA is widely used for single channel data, i.e. receiving applications with different data rates.

The transmission capacity is increased by multiplexing optical signals of different wavelengths in a single transmission line. One commonly known method of multiplexing is Wavelength Division Multiplexing (WDM). In WDM, optical signals of different wavelengths are multiplexed and transmitted simultaneously, to increase the capacity of fiber optic networks. Networks with a higher capacity can handle a number of services and higher traffic conditions. A combination of two or more optical signals, at different wavelengths, is transmitted over a common optical path. The optical path can be made up of either a single or multimode fiber. Each wavelength is capable of carrying its own independent signal at full speed. However, increasing the transmission capacity of an optical path requires an increase of the component size of a multi-channel ROSA. However, the continuous trend of increasing data transmission speed, with the need for a decrease in component size, makes it challenging to build a multi-channel ROSA by using conventional TO cans.

Further, in order to increase the transmission rate in the optical WDM transmission system, the number of wavelengths to be multiplexed is increased, or the bit rate of the respective wavelengths is made faster. This weakens the demultiplexed optical signals. Thus, there is a need to amplify the weak signals and attain an error-free reproduction. Therefore, a proper design of ROSA, with optical demultiplexing and amplification of electrical signals at high data rates, is required.

SUMMARY OF THE INVENTION

The invention provides a system and a method for receiving and demultiplexing a multiplexed optical communication signal.

An objective of the invention is to provide an optical receiver assembly for demultiplexing and interpreting an optical signal, the optical signal comprising a plurality of signals of different wavelengths, the assembly includes a demultiplexer sub-assembly, the demultiplexer sub-assembly includes a filter block sub-assembly for separating the plurality of signals of different wavelengths and a housing for the filter block sub-assembly; a multi-channel receiver optical sub-assembly for interpreting the plurality of signals of different wavelengths, wherein the plurality of signals of different wavelengths are received from the demultiplexer sub-assembly.

Another objective of the invention is to provide an optical receiver assembly for demultiplexing and interpreting an optical signal, the optical signal comprising a plurality of signals of different wavelengths, the assembly comprising a demultiplexer sub-assembly, the demultiplexer sub-assembly separating each of the plurality of signals of different wavelengths; and a multi-channel receiver optical sub-assembly for interpreting the plurality of signals of different wavelengths, the plurality of signals of different wavelengths are received from the demultiplexer sub-assembly, the multi-channel receiver optical sub-assembly includes a package, the package having a lid with an optical feed-through for the plurality of signals of different wavelengths, an array of photo-detectors, the array of photo-detectors converting the plurality of signals of different wavelengths into electrical signals, a plurality of amplifier Integrated Circuits (ICs), the plurality of amplifier ICs amplifying the electrical signals received from the array of photo-detectors, and a set of passive components, the set of passive components assisting the amplification performed by the plurality of amplifier ICs.

The invention also provides a system for demultiplexing and interpreting a received optical signal. The optical signal comprises a plurality of signals of different wavelengths. The apparatus comprises a demultiplexer sub-assembly and a multi-channel receiver optical sub-assembly. The demultiplexer sub-assembly and the multi-channel receiver optical sub-assembly are actively aligned and attached together. The demultiplexer sub-assembly comprises a filter block sub-assembly for splitting the input optical signal. The filter block sub-assembly comprises an array of photo-detectors and amplifiers for interpreting the demultiplexed optical signal. Interpreting comprises converting the optical signals into corresponding electrical signals and further amplifying them. The electrical signals are amplified by using amplifier ICs, and transmitted by using multiple electrical leads in order to achieve maximum radio frequency (RF) performance.

BRIEF DESCRIPTION OF THE DRAWINGS

The preferred embodiments of the invention will hereinafter be described in conjunction with the appended drawings provided to illustrate, and not to limit the invention, wherein like designations denote like elements, and in which.

DETAILED DESCRIPTION

Figure 1:
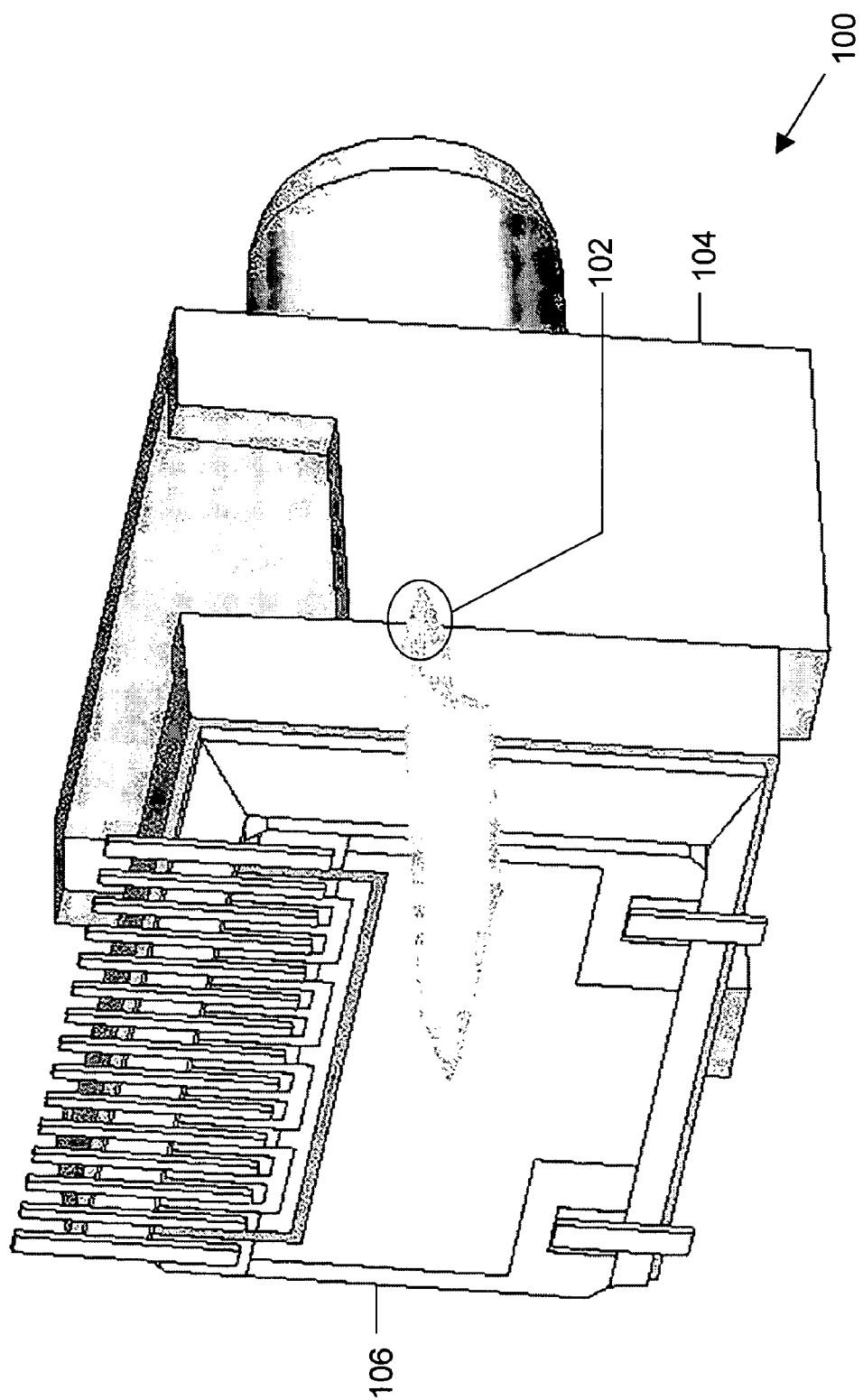
FIG. 1 illustrates an optical receiver assembly for demultiplexing and interpreting an optical signal from a source, in accordance with various embodiments of the invention.

FIG. 1 illustrates an optical receiver assembly 100 for demultiplexing and interpreting an optical signal 102 from a source, in accordance with various embodiments of the invention. The optical signal 102 can be transmitted through an optical fiber. The optical fiber can be a single mode optical fiber, or any other fiber known to those skilled in the art. In an embodiment, optical signal 102 is a Wavelength Division Multiplexed (WDM) signal. A WDM signal contains a plurality of signals of different wavelengths, which are multiplexed to be transmitted through only one optical fiber. In an exemplary embodiment of the invention, optical signal 102 comprises four signals having four different wavelengths. Although, the invention is described with respect to four signals, the number of signals that can be multiplexed is not critical, and the invention may be modified as would be apparent to one of ordinary skill in the art.

Assembly 100 comprises a demultiplexer sub-assembly 104 and a multi-channel receiver optical sub-assembly 106. Demultiplexer sub-assembly 104 separates optical signal 102 into its four constituent wavelengths. Multi-channel receiver optical sub-assembly 106 receives the four constituent wavelengths and interprets them. Interpretation comprises converting the wavelengths into electrical signals, and further amplifying the electrical signals. According to an embodiment of the present invention, the interpreted signals are further passed to electronic devices.

Figure 2:
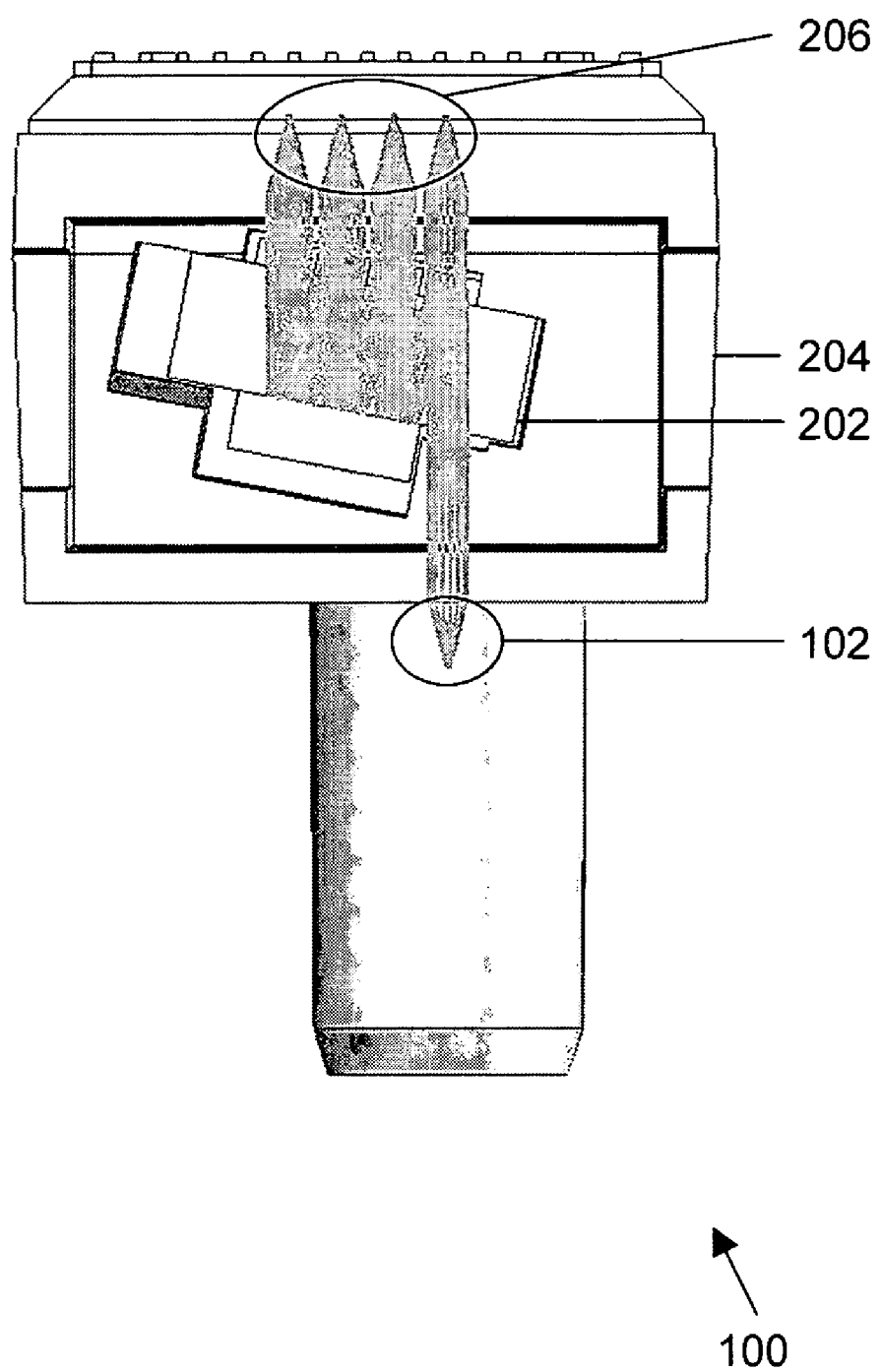
FIG. 2 is a top view of the optical receiver assembly for demultiplexing and interpreting the optical signal, in accordance with various embodiments of the invention.

FIG. 2 is a top view of the optical receiver assembly 100 for demultiplexing and interpreting optical signal 102, in accordance with various embodiments of the invention. Demultiplexer sub-assembly 104 comprises a filter block sub-assembly 202 and a housing 204 for filter block sub-assembly 202. Filter block sub-assembly 202 splits optical signal 102 into its four constituent wavelengths 206, as described below. Thus, filter block sub-assembly 202 performs the demultiplexing activity in demultiplexer sub-assembly 104. Housing 204 for filter block sub-assembly 202 also houses filter block sub-assembly 202. Housing 204 for filter block sub-assembly 202 can be made of monolithic and homogeneous materials, such as plastic. In an exemplary embodiment of the invention, housing 204 for filter block sub-assembly 202 is fabricated by using a single-shot molding process. In the single-shot molding process all the elements of housing 204 or filter block sub-assembly 202 are contained in the two opposing sides of the mold, thus ensuring optimal alignment between all the elements of housing 204.

Figure 3:
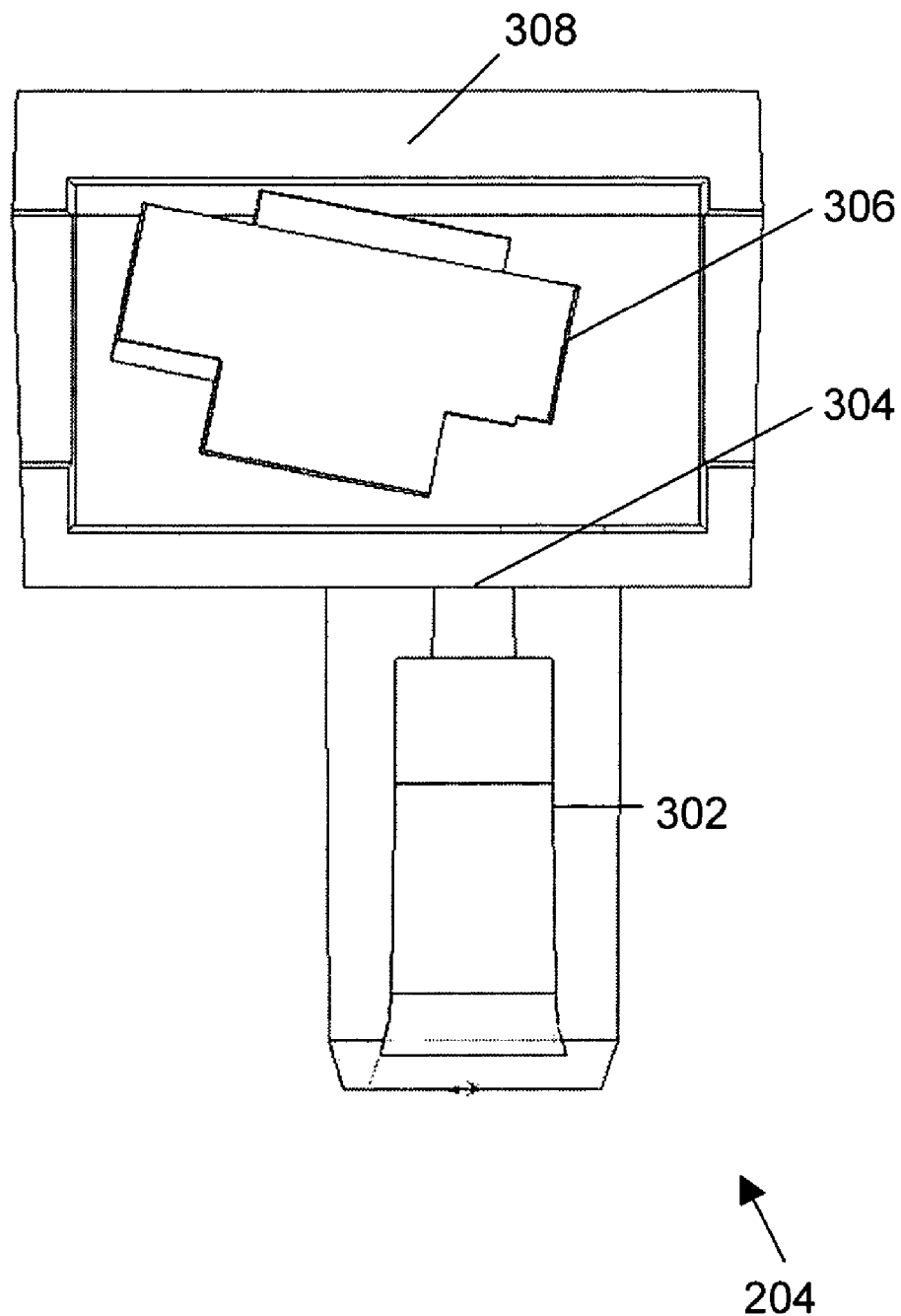
FIG. 3 is a top view of a housing for the filter block sub-assembly, in accordance with various embodiments of the invention.

FIG. 3 is a top view of housing 204 for filter block sub-assembly 202, in accordance with various embodiments of the invention. Housing 204 for filter block sub-assembly 202 comprises a receptacle bore 302, a collimating lens 304, a compartment 306 for housing filter block sub-assembly 202, and an array of lenses 308. Receptacle bore 302 holds the source of optical signal 102. As described earlier, the source can be an optical fiber such as a single-mode or multimode fiber. Collimating lens 304 is co-axially aligned to receptacle bore 302. Collimating lens 304 collimates optical signal 102 from the source into filter block sub-assembly 202. Pocket 306 houses filter block sub-assembly 202 so as to direct four constituent wavelengths 206, from filter block sub-assembly 202, on to array of lenses 308. The number of lenses in array of lenses 308 is equal to four. However, the invention should not be considered limited to four lenses. The number of lenses corresponds to the number of wavelengths in a received optical signal. Since the described embodiment contains four constituent wavelengths in the received optical signal, the number of lenses is four. In an embodiment of the invention, array of lenses 308 is separately placed as discrete lenses. The single-shot molding process for fabricating chamber 204 ensures proper alignment of the lenses.

Figure 4:
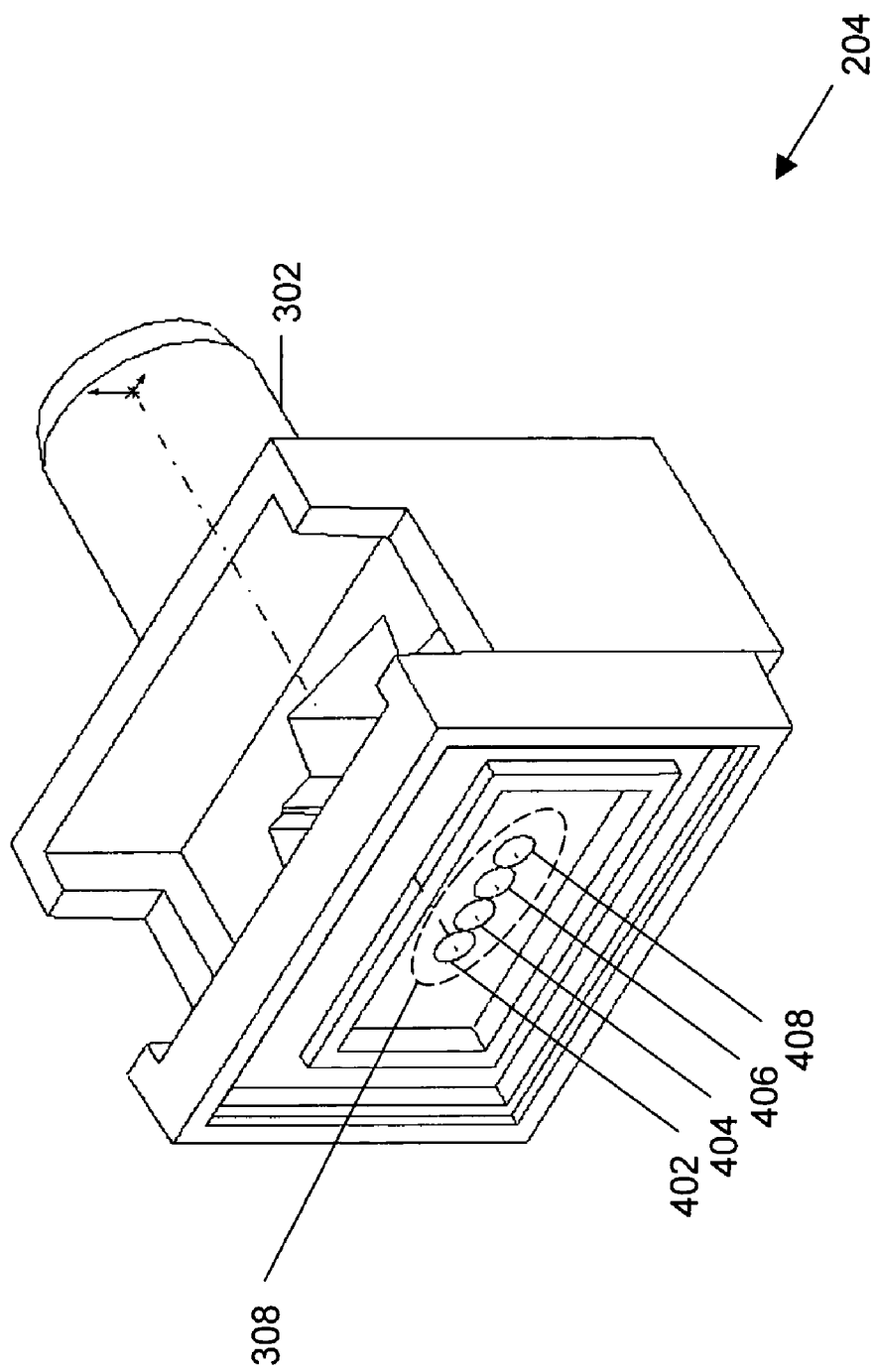
FIG. 4 is an isometric view of the housing for the filter block sub-assembly, in accordance with various embodiments of the invention.

FIG. 4 is an isometric view of housing 204 for filter block sub-assembly 202, in accordance with various embodiments of the invention. The figure depicts an exemplary alignment of array of lenses 308 and receptacle bore 302. Array of lenses 308 consists of four lenses: a first lens 402, a second lens 404, a third lens 406, and a fourth lens 408. Accordingly, in an embodiment of the present invention first lens 402 in array of lenses 308 is co-axially aligned with receptacle bore 302. The co-axial alignment is performed because the beam from the optical fiber should be focused on to first lens 402, with out any deviation. The other lenses 404, 406, and 408 are placed on the same plane as that of first lens 402, so as to receive four constituent wavelengths 206 from filter block sub-assembly 202.

Figure 5:
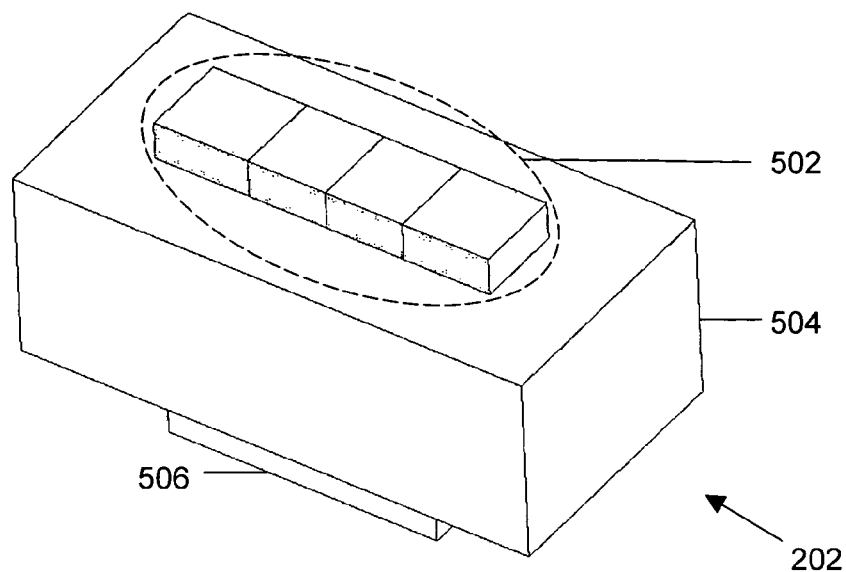
FIG. 5 is an isometric view of a filter block sub-assembly, in accordance with various embodiments of the invention.

FIG. 5 is an isometric view of filter block sub-assembly 202, in accordance with various embodiments of the invention. Filter block sub-assembly 202 comprises a plurality of filters 502, a glass spacer 504 and a reflector 506. In one embodiment of the invention, filters 502 are discretely placed. In another embodiment of the invention, filters 502 are integrated to form an array. Filters 502 and reflector 506 are placed on two opposite sides of glass spacer 504, which has flat surfaces. According to an embodiment of the invention, filters 502 are thin film interference filters. A thin film interference filter is a wavelength-specific filter, and has high transmission and low reflection over a selected set of wavelengths called pass-band, and low transmission and high reflection over another set of wavelengths called stop-band. A preferred transmission spectrum for a WDM demultiplexer application is of a flat-top shape, in which a very high uniform transmission is achieved over the pass-band wavelength interval. Further, immediately outside the pass-band wavelength interval very low transmission and high reflection is achieved.

Figure 6:
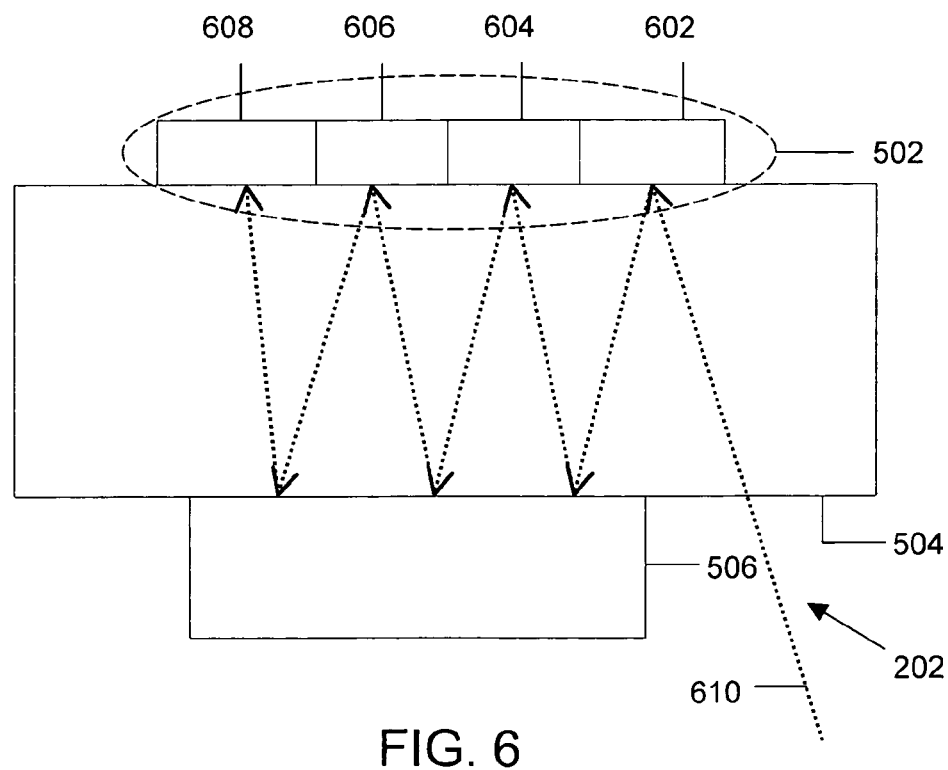
FIG. 6 is a front view of the filter block sub-assembly, in accordance with various embodiments of the invention.

FIG. 6 is a front view of filter block sub-assembly 202, in accordance with various embodiments of the invention. Filters 502 include a first filter 602, a second filter 604, a third filter 606, and a fourth filter 608. Path 610 is the path of the optical signal emerging from collimating lens 304 to filters 602, 604, 606 and 608. Filter block sub-assembly 202 is housed in chamber 204, so as to place first filter 602 on the optical axis of collimating lens 304. The placement of first filter 602 on the optical axis of collimating lens 304 ensures that first filter 602 is directly in the path of the optical signal emerging from the optical fiber. Filter block sub-assembly 202 is placed at an angle to the optical axis of collimating lens 304. In an embodiment, filter block sub-assembly 202 is placed at an angle of 45 degrees to the optical axis of collimating lens 304.

Optical signal 102, received by collimating lens 304, is collimated and transmitted into glass spacer 504 from the surface where reflector 506 is located. Optical signal 102 is transmitted through glass spacer 504. Glass spacer 504 transmits one wavelength out of four constituent wavelengths 206 to first filter 602. Other three wavelengths are reflected into glass spacer 504. In an embodiment of the invention, first filter 602 reflects the other three wavelengths into glass spacer 504. In another embodiment of the invention, the other three wavelengths are reflected into glass spacer 504 by the process of total internal reflection. Glass spacer 504 directs the other three wavelengths to reflector 506. Reflector 506 reflects the three wavelengths into glass spacer 504. Reflector 506 is a flat surface that reflects the wavelengths reflected back from first filter 602 to second filter 604 and so on, through glass spacer 504. Glass spacer 504 transmits one wavelength out of the other three wavelengths to second filter 604. Glass spacer 504 directs the other two wavelengths to reflector 506. Similarly, each of the other two wavelengths is transmitted to filters 606 and 608, respectively. The angle that filter block sub-assembly 202 makes with the optical axis of collimating lens 304 is calculated so as to allow one wave length through each of filters 502. Each of filters 502 filters one wavelength of optical signal 102. The filtered wavelengths are further transmitted to array of lenses 308. Each lens of array of lenses 308 focuses one wavelength into the receiver optical sub-assembly 106.

Figure 7:
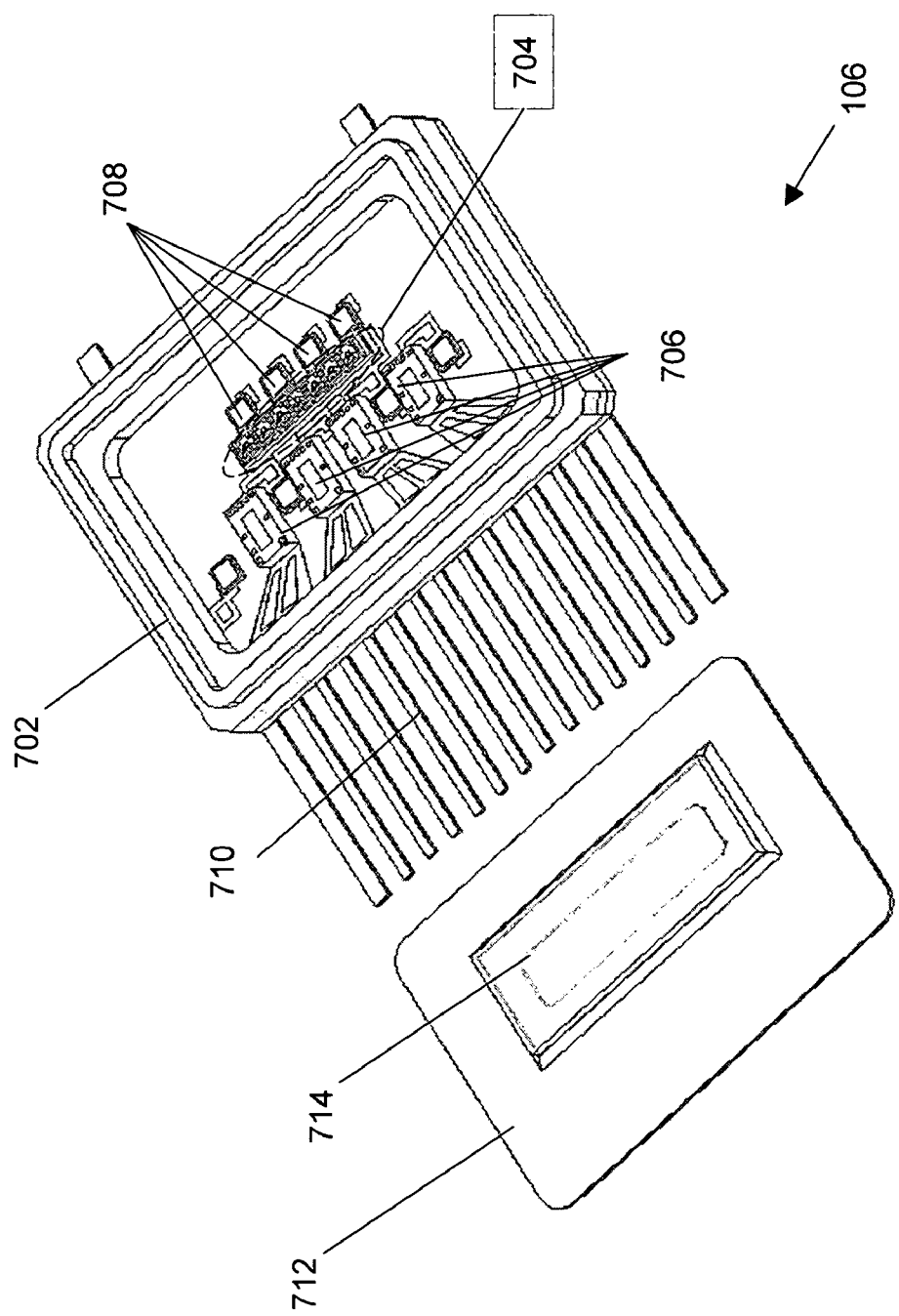
FIG. 7 illustrates a multi-channel receiver optical sub-assembly, in accordance with various embodiments of the invention.

FIG. 7 illustrates multi-channel receiver optical sub-assembly 106, in accordance with various embodiments of the invention. Multi-channel optical receiver sub-assembly 106 is suitable to be mounted to housing 204. Multi-channel optical receiver sub-assembly 106 comprises a package 702. Inside package 702 are placed an array of photo-detectors 704, a plurality of amplifier ICs 706, and a set of passive components 708. Multi-channel receiver optical sub-assembly 106 also comprises a plurality of electrical leads 710 and a lid 712 that cover package 702. Plurality of electrical leads 710 transmit the electrical signal from optical receiver assembly 100 to the external electronic devices. Lid 712 comprises an optical feed-through 714. In an embodiment of the invention, package 702 is a hermetic package made of a ceramic material. These components are explained in detail in the subsequent paragraphs.

Figure 8:
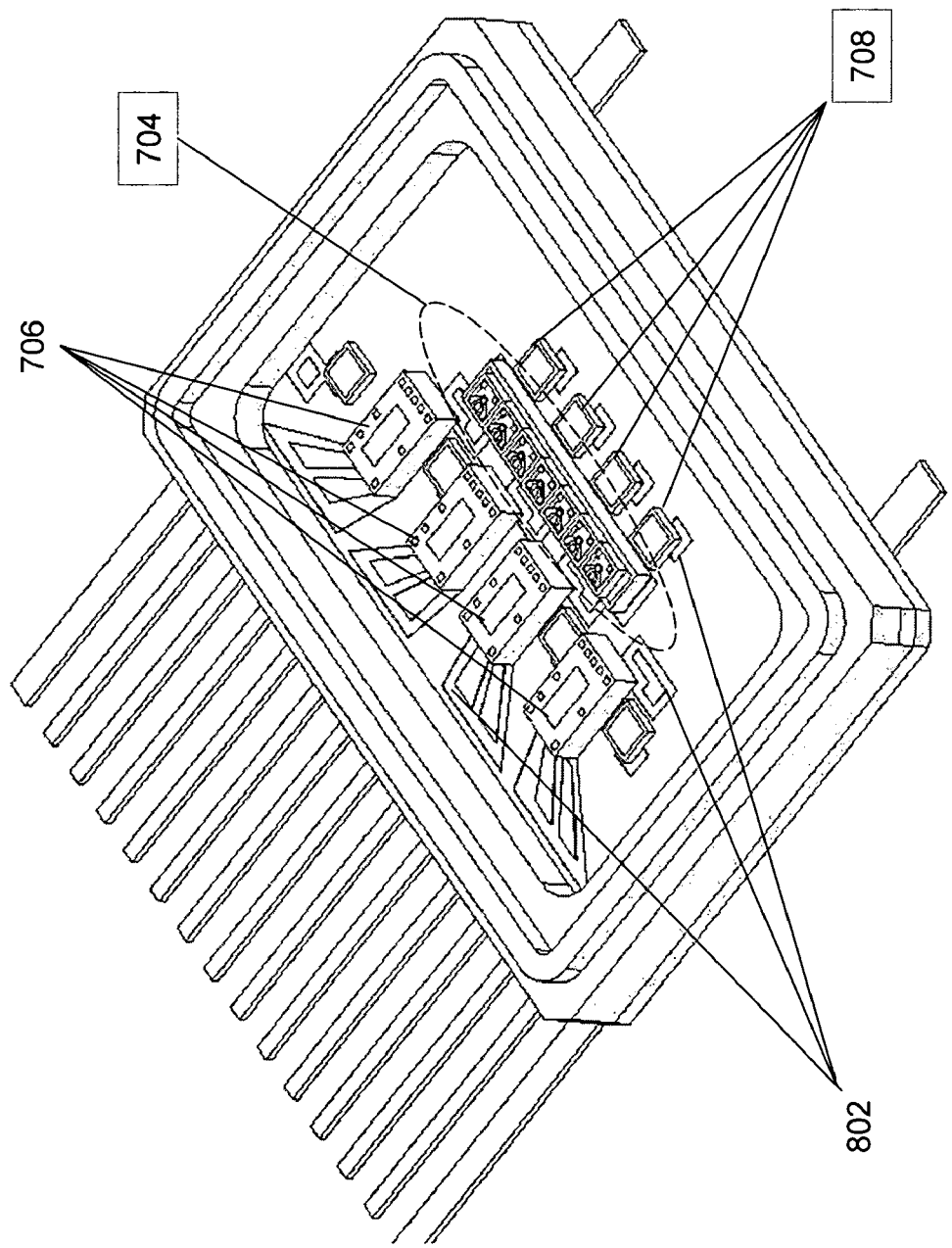
FIG. 8 illustrates the placement of components of a multi-channel receiver optical sub-assembly in a package, in accordance with various embodiments of the invention.

FIG. 8 illustrates the placement of components in package 702, in accordance with various embodiments of the invention. The communication between amplifier ICs 706 and electrical leads 710 is enabled by RF feed-through lines 802.

Optical feed-through 714 transmits four constituent wavelengths 206 from demultiplexer sub-assembly 104 to array of photo-detectors 704. Array of photo-detectors 704 converts four constituent wavelengths 206 to electrical signals. The electrical signals are transmitted to amplifier ICs 706. Amplifier ICs 706 convert the electrical signals into voltages. The voltages are amplified to a pre-defined value. Set of passive components 708 assists amplifier ICs 706, to achieve a desired amplification characteristic, for the amplified electrical signals. During the functioning of multi-channel receiver optical sub-assembly 106, amplifier ICs 706 generate heat which needs to be dissipated through the package. The heat is dissipated through the package by using a thermal path that extends through the package. The thermal path comprises one or more metallized via. According to an embodiment of the invention, there are four via for each amplifier ICs 706. The thermal path extends to an external heat sink.

Figure 9:
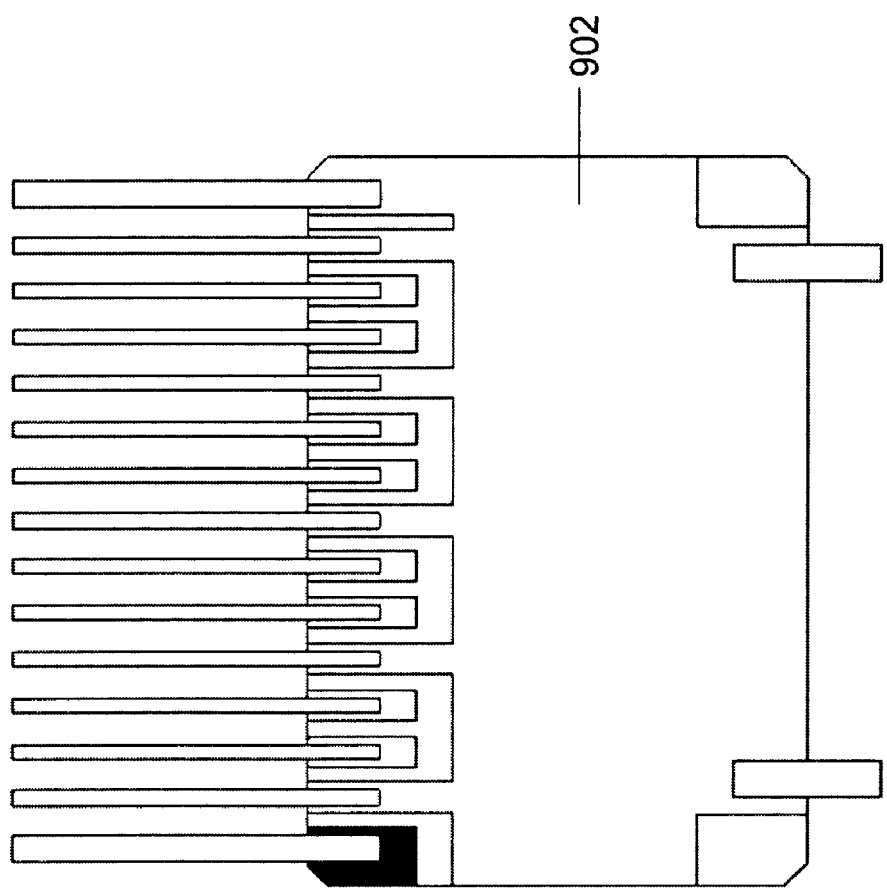
FIG. 9 illustrates a metal pattern on the back side of the multi-channel receiver optical sub-assembly, in accordance with various embodiments of the invention.

FIG. 9 illustrates a metal pattern 902 on the rear of multi-channel receiver optical sub-assembly 106, in accordance with various embodiments of the invention. Heat generated by amplifier ICs 706 is carried to metal pattern 902 through the thermal path formed by the path between amplifier ICs 706 to metal pattern 902. The heat carried by the thermal path is dissipated by metal pattern 902. Hence metal pattern 902 is used as an external heat sink for effective heat dissipation.

Demultiplexer sub-assembly 104 and multi-channel receiver optical sub-assembly 106 are actively aligned and fixed together. De-multiplexed constituent wavelengths 206, that result from demultiplexer sub-assembly 104, are transmitted into multi-channel receiver optical sub-assembly 106 through optical feed-through 714 provided in lid 712. Therefore, it is required that the two assemblies be aligned so that the transmission through optical feed-through 714 is done with minimal loss of signal intensity. Post alignment, demultiplexer sub-assembly 104 and multi-channel receiver optical sub-assembly 106 can be fit together and secured with an adhesive. An exemplary form of adhesive can be epoxy. The alignment is achieved so as to attain a peak coupling efficiency between demultiplexer sub-assembly 104 and multi-channel receiver optical sub-assembly 106.

In an embodiment of the invention, the alignment of both the assemblies with respect to one another is performed by using a set-up that includes two or more of translation stages with fine movement in X-Y-Z directions; an electrical Printed Circuit Board (PCB) unit with connectors; an UV light source; a source of a multiplexed optical signal with optical fiber interface; and a test equipment for monitoring electrical signals. The process of active alignment, in accordance with various embodiments of the invention, includes placing multi-channel receiver optical sub-assembly 106 on the electrical PCB unit. The electrical PCB unit has electrical lanes with exact spacing corresponding to the pitch of plurality of electrical leads 710. The PCB has connectors suitable for connections with the test equipment and a power supply source. Following this, the PCB unit with multi-channel receiver optical sub-assembly 106 on board is fixed on a translation stage with fine movement in X-Y-Z directions. Demultiplexer sub-assembly 104 is fixed on another translation stage with fine movement in X-Y-Z directions just above multi-channel receiver optical subassembly 106 in such a way that de-multiplexed constituent wavelengths 206 will roughly fall on array of photo-detectors 704 in multi-channel receiver optical sub-assembly 106. A predetermined amount of UV-cured epoxy is applied on lid 712 except on optical feed-through 714 of multi-channel receiver optical sub-assembly 106. The source of the multiplexed optical signals is inserted into receptacle bore 302 of demultiplexer sub-assembly 104. The connectors of the electrical PCB are connected to the test equipment.

The source of four wavelength multiplexed optical signal is activated and the process of active optical alignment is started. During optical alignment, a fine movement in the X-Y-Z directions of the translation stages is performed, and the electrical signals from all the four channels of the multi-channel receiver optical sub-assembly 106, through an electrical PCB, are monitored simultaneously by using the test equipment. Once the maximum monitored electrical signal which corresponds to the output voltage amplitude from amplifier ICs 706 is achieved for all four channels, the movement of the stages is stopped, and the UV source is activated. Consequently, the demultiplexing receiver optical subassembly comprising multi-channel demultiplexer sub-assembly 104 and multi-channel optical receiver sub-assembly 106 is removed from the alignment set-up. Epoxy is UV-cured for effective bonding.

Figure 10:
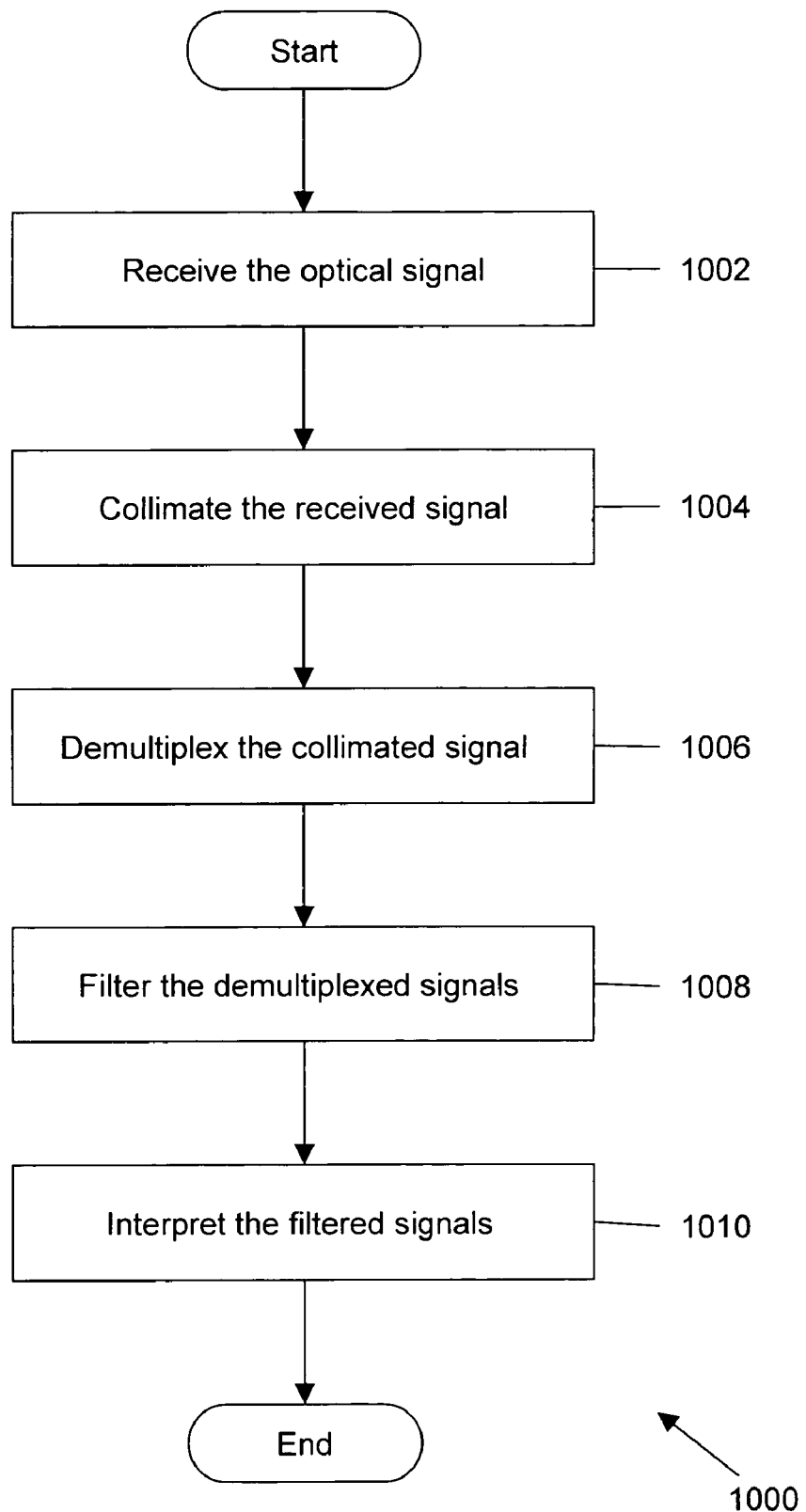
FIG. 10 is a flowchart, depicting a method for demultiplexing and interpreting an optical signal, in accordance with various embodiments of the invention.

FIG. 10 is a flowchart 1000, depicting a method for demultiplexing and interpreting optical signal 102, in accordance with various embodiments of the invention. At step 1002, optical signal 102 is received by assembly 100. At step 1004, the received optical signal 102 is collimated into the assembly by a collimating lens. At step 1006, collimated optical signal 102 is demultiplexed into four constituent wavelengths. At step 1008, each of the demultiplexed wavelengths is filtered out as four constituent wavelengths 206, by a plurality of filters 502. At step 1010, the filtered wavelengths are interpreted by multi-channel receiver optical sub-assembly 106. As mentioned earlier, interpreting the wavelengths comprises converting the optical signal to electrical signals, and further amplifying them.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. An optical receiver assembly for demultiplexing and interpreting an optical signal, the optical signal comprising a plurality of signals of different wavelengths, the assembly comprising:
   a. a demultiplexer sub-assembly, comprising:
      i. a filter block sub-assembly for separating the plurality of signals of different wavelengths, comprising:
         A. a glass spacer, the glass spacer introducing different path delays in the transmission of each of the plurality of signals of different wavelengths;
         B. a reflector, the reflector reflecting the optical signal received from the glass spacer back into the glass spacer; and
         C. a plurality of filters, each of the plurality of filters filtering one of the plurality of signals of different wavelengths, wherein a first of the plurality of filters is co-axially aligned with a path of the optical signal and transmits one of the plurality of signals substantially without deviation; and
      ii. a housing for housing the filter block sub-assembly, wherein the housing comprises:
         a. a receptacle bore with a collimating lens, the collimating lens collimating the optical signal into the filter block sub-assembly;
         b. a pocket for holding the filter-block assembly; and
         c. an array of lenses, the array of lenses focusing the plurality of signals of different wavelengths received from the filter block sub-assembly onto the receiver sub-assembly, wherein a first lens of the array of lenses is co-axial with the receptacle bore and receives the one of the
            plurality of signals transmitted by the first filter, wherein the housing is plastic that is molded in a single shot molding process such that at least the filter block sub-assembly or a pocket for the filter block sub-assembly, a receptacle bore and collimating lens, and the array of lenses are contained in two opposing sides of a single shot mold providing optical alignment for the optical receiver assembly; and
   b. a multi-channel receiver optical sub-assembly mounted to the housing for interpreting the plurality of signals of different wavelengths, wherein the plurality of signals of different wavelengths are received from the demultiplexer sub-assembly.

2. The optical receiver assembly according to claim 1, wherein the demultiplexer sub-assembly and the multi-channel receiver optical sub-assembly are actively aligned and fixed together.

3. The optical receiver assembly according to claim 1, wherein each of the plurality of filters is wavelength-specific thin film interference filter.

4. An optical receiver assembly for demultiplexing and interpreting an optical signal, the optical signal comprising a plurality of signals of different wavelengths, the assembly comprising:
   a. a demultiplexer sub-assembly, the demultiplexer sub-assembly separating each of the plurality of signals of different wavelengths, comprising:
      i. a filter block sub-assembly; and
      ii. at least one optical filter,
   the filter block sub-assembly is oriented at an angle to a path of the optical signal that is calculated to transmit substantially one wavelength of the optical signal to the at least one optical filter;
   b. a multi-channel receiver optical sub-assembly for interpreting the plurality of signals of different wavelengths, wherein the plurality of signals of different wavelengths are received from the demultiplexer sub-assembly, the multi-channel receiver optical sub-assembly comprising:
      i. a package, the package comprising a lid with an optical feed-through for the plurality of signals of different wavelengths;
      ii. an array of photo-detectors, the array of photo-detectors converting the plurality of signals of different wavelengths into electrical signals;
      iii. a plurality of amplifier Integrated Circuits (ICs), the plurality of amplifier ICs amplifying the electrical signals received from the array of photo-detectors; and
      iv. a set of passive components, the set of passive components assisting the amplification performed by the plurality of amplifier ICs; and
   c. a housing for housing the filter block sub-assembly, the housing comprising:
      a receptacle bore with a collimating lens, the collimating lens collimating the optical signal into the filter block sub-assembly,
      a pocket for holding the filter-block assembly; and
      an array of lenses, the array of lenses focusing the plurality of signals of different wavelengths received from the filter block sub-assembly onto the receiver sub-assembly, wherein a first lens of the array of lenses is co-axial with the receptacle bore and receives the one of the plurality of signals transmitted by the first filter, wherein the housing is plastic that is molded in a single shot molding process such that at least the filter block sub-assembly or a pocket for the filter block sub-assembly, a receptacle bore and collimating lens, and the array of lenses are contained in two opposing sides of a single shot mold providing optical alignment for the optical receiver assembly.

5. The optical receiver assembly according to claim 4, wherein the package comprises a ceramic material.

6. The optical receiver assembly according to claim 4, wherein the plurality of amplifier ICs are connected to an electrical circuit via electrical leads.

7. The optical receiver assembly according to claim 6, wherein the plurality of amplifier ICs are connected to the electrical leads via RF feed-through lines.

8. The optical receiver assembly according to claim 4, wherein the array of photo-detectors is connected to the plurality of amplifier ICs via bonded wires.

9. The optical receiver assembly according to claim 4, wherein the multi-channel receiver optical sub-assembly further comprises a thermal path extending through the package.

10. The optical receiver assembly according to claim 9, wherein the thermal path comprises multiple metallized via extending through the package.

11. The optical receiver assembly according to claim 9, wherein the thermal path comprises a metal pattern, the metal pattern exposed to the outside surface of the package.

12. The optical receiver assembly according to claim 9, wherein the thermal path comprises multiple metallized via extending towards a metal pattern, the metal pattern being exposed to the outside surface of the package.

13. An optical receiver assembly for demultiplexing and interpreting an optical signal, the optical signal comprising a plurality of signals of different wavelengths, the assembly comprising:
   a. a demultiplexer sub-assembly, the demultiplexer sub-assembly comprising:
      i. a filter block sub-assembly for separating the plurality of signals of different wavelengths, the filter block sub-assembly comprising:
         1. a glass spacer, the glass spacer introducing different path delays in transmission of each of the plurality of signals of different wavelengths;
         2. a reflector, the reflector reflecting the optical signal received from the glass spacer back into the glass spacer; and
         3. a plurality of filters, each of the plurality of filters filtering one of the plurality of signals of different wavelengths; and
      ii. a housing for housing the filter block sub-assembly;
   b. a multi-channel receiver optical sub-assembly mounted to the housing for interpreting the plurality of signals of different wavelengths, wherein the plurality of signals of different wavelengths are received from the demultiplexer sub-assembly, the multi-channel receiver optical sub-assembly comprising:
      i. a package, the package comprising a lid with an optical feed-through for the plurality of signals of different wavelengths;
      ii. an array of photo-detectors, the array of photo-detectors converting the plurality of signals of different wavelengths into electrical signals;
      iii. a plurality of amplifier Integrated Circuits (ICs), the plurality of amplifier ICs amplifying the electrical signals received from the array of photo-detectors; and
      iv. a set of passive components, the set of passive components assisting the amplification performed by the plurality of amplifier ICs,
   wherein at least one of:
   a. a first of the plurality of filters is co-axially aligned with a path of the optical signal and transmits one of the plurality of signals substantially without deviation;
   b. a first lens of the array of lenses is co-axial with the receptacle bore and receives the one of the plurality of signals transmitted by the first filter; or
   c. the housing is plastic that is molded in a single shot molding process such that at least the glass spacer, receptacle bore and collimating lens, and array of lenses are contained in two opposing sides of a single shot mold providing optical alignment for the optical receiver assembly.

14. The optical receiver assembly of claim 13, the filter block sub-assembly is oriented at an angle to a path of the optical signal that is calculated to transmit substantially one wavelength of the optical signal to each of the plurality of filters.

15. The optical receiver assembly of claim 1, the filter block sub-assembly is oriented at an angle to the optical signal, the angle is calculated to transmit substantially one of the plurality of signals from the glass spacer to a first of the plurality of filters and reflect the remaining signals into the glass spacer.

* * * * *